(12) United States Patent
Coolong et al.

(10) Patent No.: US 8,062,736 B1
(45) Date of Patent: Nov. 22, 2011

(54) OVERMOLDED LAYERED ARTICLE

(75) Inventors: Robert J. Coolong, Monson, MA (US);
James F. Ryan, Millville, MA (US);
Robert L. Underwood, Winnetka, IL (US)

(73) Assignee: Polymer Corporation, Rockland, MA (US)

( * ) Notice: Subject to any disclaimer, the term of this patent is extended or adjusted under 35 U.S.C. 154(b) by 711 days.

(21) Appl. No.: 11/852,542

(22) Filed: Sep. 10, 2007

Related U.S. Application Data

(60) Provisional application No. 60/825,027, filed on Sep. 8, 2006.

(51) Int. Cl.
*B41M 5/00* (2006.01)
(52) U.S. Cl. ............... 428/195.1; 42/71.01; 264/129; 264/132; 428/141; 428/142

(58) Field of Classification Search ............... 428/195.1, 428/141, 142; 42/71.01; 264/129, 132
See application file for complete search history.

(56) References Cited

U.S. PATENT DOCUMENTS

| | | | | |
|---|---|---|---|---|
| 3,865,166 | A * | 2/1975 | Pedro | 206/317 |
| 5,778,590 | A * | 7/1998 | Browning et al. | 42/96 |
| 6,301,817 | B1 * | 10/2001 | Hogue et al. | 42/71.01 |
| 6,790,525 | B2 * | 9/2004 | Takeuchi et al. | 428/339 |
| 6,852,394 | B2 | 2/2005 | Otaki et al. | |

* cited by examiner

*Primary Examiner* — Bruce H Hess
*Assistant Examiner* — Tamra L Amakwe
(74) *Attorney, Agent, or Firm* — Cesari and McKenna, LLP

(57) ABSTRACT

An overmolded article and process for camouflaging or layering the overmolded article, e.g. hunting equipment, etc., is described. The camouflaged or layered areas run continuously from outside to beneath the overmolded areas on the article so there are no lines of edges where the camouflaged or layered areas end and the overmolding areas begin.

9 Claims, 1 Drawing Sheet

OVERMOLDED LAYERED ARTICLE

CROSS-REFERENCE TO RELATED APPLICATIONS

The present application claims the benefit of U.S. Provisional Patent Application Serial No. 60825027, which was filed on Sep. 8, 2006. This provisional application is hereby incorporated by reference.

BACKGROUND OF THE INVENTION

1. Field of the Invention

The present invention relates to a camouflaged article with overmolded areas, and more particularly to an article formed from a molded plastic insert with overmolded portions. Herein the word "camouflage," sometimes referred to as "camo," is defined as any finish, typically, but not necessarily, patterned, that is applied to an article that is then overmolded.

2. Background Information

Typically camouflaged articles include: gun stocks, pistol grips, bows, crossbows, is other archery and hunting equipment, paint ball equipment, personal locating devices and other such outdoor equipment. For example, all terrain vehicles may have a number of molded plastic pieces that might be camouflaged. Fenders, bumpers, outer bodies and gas tanks are often made of plastic, camouflaged and overmolded. Such items may benefit from the present invention. The camouflage, as the name implies, may be used to obscure or hide the presence or the identity of the article possessed by the user. However, camouflage, other patterns, scenes and/or colors, etc. may be a decorative device applied as a layer to overmolded articles.

Gun stocks, particularly long gun stocks and other hunting equipment, are often camouflaged, and much of the following discussion relates to gun stocks, but the present application, as mentioned above, applies to any camouflaged or layered overmolded article.

Long gun stocks are often overmolded and camouflaged as desired by hunters. The overmolding provides a comfortable gripping surface and a look that is desirable to users. Overmolding is known in the art, and U.S. Pat. No. 6,301,817 ('817), filed Nov. 14, 1996, issued Oct. 16, 2001 to Hogue, describes processes for applying overmold material to a base gun stock insert. This U.S. patent is hereby incorporated herein by reference.

Referencing FIG. 1 and the '817 patent, overmold material 4 is applied directly to portions of or substantially the entire stock insert 10. Typically a shallow depression 9 is formed in the insert 10 and a matching one (not shown) in the final injection mold used to apply the overmold material. A camouflage layer 5 is applied to the areas not covered by is the overmold 4. The result are edges 7 where the camouflage ends and the overmold begins. See FIG. 7 of the '817 patent where, item 32, the overmold material, is directly applied to the stock insert 1 and FIG. 13 of the '817 patent shows areas 44 and 43 where overmold material is applied to portions of the insert. The last sentence in the '817 Abstract reads, "The thermoplastic elastomer over-molded material is compatible with the material of the insert and bonds both mechanically and chemically with the insert, providing the stock with a soft, quiet, non-slip surface."

In the prior art, camouflage is applied to a long gun stock after the overmolding, since the prior art overmolding materials do not adhere, either mechanically or chemically, well to the camouflage materials. In particular, the gun stock is molded of thermoplastic material to which the thermoplastic elastomer overmold material easily bonds. However, the outer layer of a camouflage process is typically polyurethane to which the prior art thermoplastic elastomer overmold material does not bond well. Thus, overmolding is applied before camouflage to a long gun stock insert.

Therefore, in the prior art, to apply camouflage, the overmolded areas are typically masked and unmasked by hand and then the camouflage is applied to the exposed un-overmolded surface areas. However, the edges, item 7 of FIG. 1, where the overmolding and the camouflage meet, are often not sharp or well defined. Moreover, there may be exposed areas with no camouflage near the edge 7. In addition, the masking and unmasking are labor intensive, time consuming, costly and require skilled workers.

For a prior art description for applying camouflage to gunstocks, see www.immersiongraphics.com, and www.tarjac.com.

Camouflaging the article after overmolding is not done since the camouflage materials adversely affect the non-slip, tactile, overmold surface. Moreover, it may damage the overmold material, and since the overmold material is typically soft, with use, a camouflage layer on the overmold material may crack, becoming unsightly or unusable.

The present invention addresses many of the limitations of the prior art.

SUMMARY OF THE INVENTION

The present invention provides a layered article and a process for applying layers to an article. The process typically includes applying one or more layers to the raw surface of the article, and injection molding a material onto the layers. As mentioned above one layer may (or may not) provide camouflage or be patterned, and if patterned, the pattern may be of any scene or any other visual or decorative devices. In other illustrative embodiments, one or more of the layers may be colored, or the insert itself may be colored.

The overmold material is preferably a thermoplastic vulcanizate (TPV) material that adheres well to the outer-most surface of the layers. Other materials, see below, with similar properties as TPV may be used with the present invention.

In one illustrative embodiment the number of layers may be, but not necessarily, three or four. In one example, a first layer overcoats and seals the raw surface of the article, and a primer layer overlays and adheres well to the sealer layer. The primer provides a surface that accepts and adheres well to a patterned ink layer that overcoats the primer layer. A polyurethane outer layer is then applied over the preceding layers and allowed to set. If the sealer layer is omitted, the primer is selected of a material that will adhere to the surface of the article while still providing good adherence for the patterned layer.

Illustratively, the patterned layer may be applied by taking a transfer film bearing an ink pattern and applying the film to the article by immersing the article in a liquid bath to transfer the ink to the surface of the article. This process or similar processes are known to those skilled in the art.

It will be appreciated by those skilled in the art that although the following Detailed Description will proceed with references being made to illustrative embodiments, the drawing, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The present invention may be better understood by referring to the following detailed description in conjunction with the accompanying drawings.

DETAILED DESCRIPTION OF AN ILLUSTRATIVE EMBODIMENT

Figure 1:
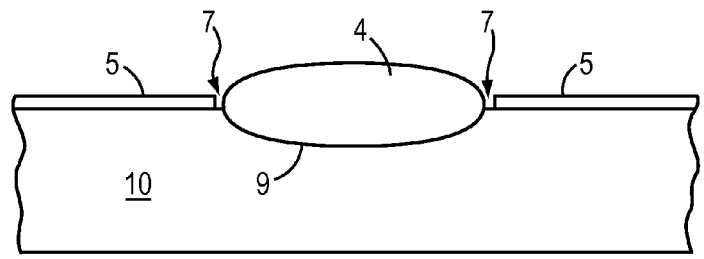
FIG. 1 is a representation of an article 10 with an overmolded material 4.
Figure 2:
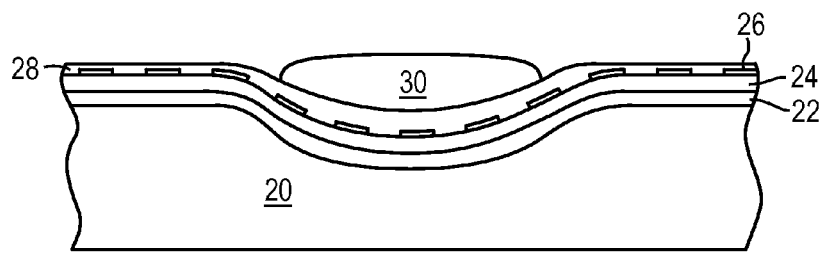
FIG. 2 is a cross section of the layers applied to an overmolded article camouflaged according to the present invention.

FIG. 2 illustrates an article or insert made of a thermoplastic material with four layers that comprise a camouflage application. The injection overmold material 30 is applied directly to the outer layer 28. This is in contrast to the prior art assembly of FIG. 1.

An illustrative application of camouflage may comprise four layers, for example items 22, 24, 26 and 28 of FIG. 2, of materials that are applied to an article. Some layers may be sprayed or brushed on, others by dipping or by other specialized deposition processes. Fewer or more layers may be provided in some embodiments.

Illustratively, the article may be a reinforced, thermoplastic rigid long gun stock. Typically, the outer most layer 28 is hardened polyurethane to which the thermoplastic vulcanization injection overmold material 30 is applied. The layers may be as follows:

a) a Fluoro-Seal, a special molecular deposition material and process that are available from Fluoro-Seal, Inc., Houston Tex., item 22;

b) Primer paint coat, item 24;

c) An ink patterned layer, item 26; and a d) Final clear coat, item 30, that protects the surface from physical and possibly ultra violet, UV, damage.

The Fluoro-Seal neutralizes or otherwise prepares the raw surface of the article for better adhesion of the next layer. The primer coat may provide background color and tone for a desired camouflage look. In some embodiments the Fluoro-Seal layer is omitted, and the primer layer may be selected for good adhesion to the article, the ink layer (if present) and to an outer polyurethane layer.

A technique and process for laying down patterns on plastic articles, that may be used in some embodiments of the present invention, may be found in U.S. Pat. No. 6,852,394 ('394). This patent is assigned to Cubic Co., Ltd, Shizuoka, Japan. The '394 patent illustratively describes four layers that adhere well to each other in one embodiment, where the pattern itself is formed of and in an ink layer. The '394 patent is hereby incorporated herein by reference.

Figure 3:
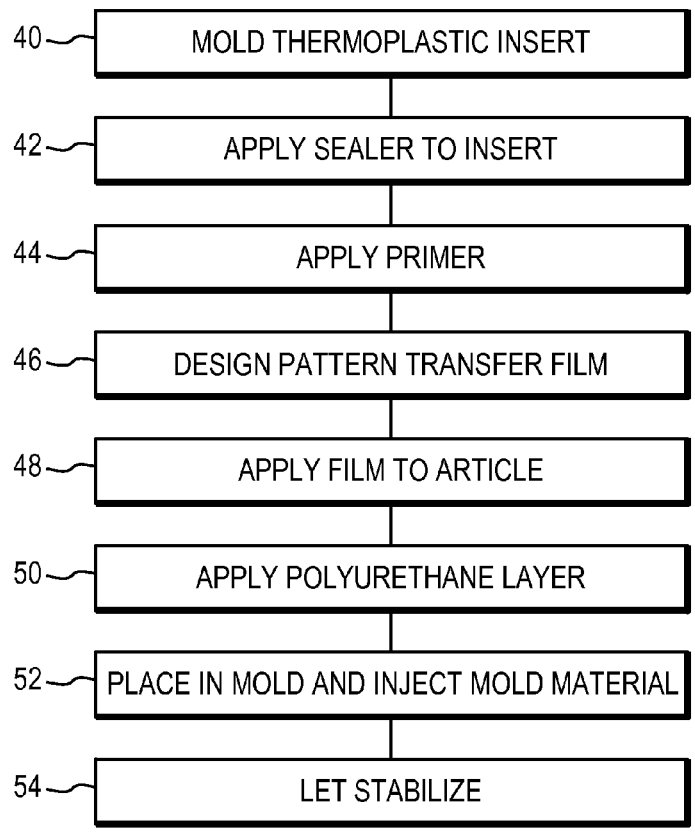
FIG. 3 is a flow chart illustrating the application of a layers to and overmolding of an article.

FIG. 3 illustrates in more detail one method of laying down layers, e.g. camouflage or other patterns, onto an article. Alternative methods discussed in the '394 patent may be used as one skilled in the art would know. Typically the article is molded of thermoplastic 40, and a sealer (e.g., Fluoro-Seal) is applied 42 that neutralizes and stabilizes the raw surface of the article. The term "raw" refers to surface of the article as it appears directly from the mold where it was formed. The raw surface may be smoothed or roughened, but with no material added to the surface. A primer is applied 44 over the sealer. The pattern or camouflage ink or inks are applied 46 to the article. The final coat of polyurethane overlays 50 the item and sets to a hard outer surface. The article is placed into a final mold and the TPV overmold material 30 is injected into voids in the article The overmolded article is then stabilized 54. It is understood that distortions due to shrinkage, warpage, and outside forces may affect the overmolded article; however, using compatible materials will minimize these effects.

Notice in FIG. 2 that the ink layer 26 only covers the primer layer 24 where the pattern exists. The polyurethane outer layer 28 contacts the primer layer in locations devoid of ink 26. The ink or inks will, preferable, have a fluoropolymer resin ingredient with an inorganic pigment that is weather resistance for long life without fading or changing color.

In one illustrative embodiment the final coat is hardened polyurethane, so the overmolding material must be selected to achieve a good bond with the polyurethane. A thermoplastic vulcanizate, TPV, satisfies this requirement.

is As illustrated in FIG. 2 the layers 22, 24, 26 and 28 are continuous over the article's surface and run under the overmolding material 30. This ensures there are no edges to the camouflage pattern at the edges of the overmolded areas.

One example of a satisfactory TPV is from the 8211 series of SANTOPRENET™, a trademark of Advance Elastomer Systems, LP, affiliated with Exxon Mobil. These materials adhere well to a hardened polyurethane surface. Other SANTOPRENET™ materials not from the 8211 series do not adhere well to the hardened polyurethane. For example, prior art thermoplastic elastomer (e.g., such as those described in the '817 patent) overmolding materials do not adhere well.

TPV and similar materials may be obtained form other sources known to those skilled in the art. For example, Versalloy, grade OM 1255NX, is a soft thermoplastic urethane (TPU) thermoplastic elastomer (TPE) alloy made by GLS Corp. of McHenry, Illinois, that has many of the characteristics of TPV and may be used advantageously in the present invention. See the web site: http://www.glscorporation.com/products.php.

Another known process that may be used with the present invention for laying down patterns on plastic articles is called the Katsuya process and is available from Immersion Graphics Corp. (see earlier web site). This process also provides a polyurethane final surface that sets to a hard outer surface.

Both of the above processes, as well as others, may be used with preferred embodiments of the present invention.

As known to those skilled in the art, "knit lines" (terms of art) are undesirable. For overmolded areas the overmold material may be introduced through one gate which will minimize flow disturbances in the flow of TPV.

Wherever possible, areas where delamination may occur, should be avoided. Designs should provide mechanical bonds, especially in areas with thin fleeting edges.

It should be understood that above-described embodiments are being presented herein as examples and that many variations and alternatives thereof are possible. Accordingly, the present invention should be viewed broadly as being defined only as set is forth in the hereinafter appended claims.

What is claimed is:

1. An article comprising:
   an insert made of thermoplastic resin having a surface, the surface having one or more areas to be overmolded and another area not to be overmolded, said one or more areas and said another area meeting at one or more boundries,
   a first layer having a pattern, wherein the first layer overcoats the surface including the one or more areas to be overmolded and the area not to be overmolded;

a clear, protective layer that overcoats the first layer and the underlying surface with the one or more areas to be overmolded and the area not to be overmolded; and an overmold material molded to the one or more areas to be overmolded, said overmold material having edges adjacent said one or more boundries wherein the overmold material adheres to the clear, protective layer and the clear, protective layer and the first layer extend from beneath the overmold material to the area that is not to be overmolded so that there are no visible gaps in said pattern at said edges.

2. The article of claim 1 further comprising a primer paint layer applied to the article's surface before the first layer is applied.

3. The article of claim 2 further comprising an adhesion layer applied to the surface of the article before the primer paint layer is applied.

4. The article of claim 1 wherein the overmolded material is a thermoplastic elastomer.

5. The article of claim 1 wherein the article is selected from a group consisting of: long gun stocks, pistol grips, bows, crossbows, paint ball equipment, and personal locating devices.

6. The article of claim 4 wherein the thermoplastic elastomer is thermoplastic vulcanizate.

7. The article of claim 1 wherein the first layer comprises a transfer film bearing an ink pattern.

8. The article of claim 7 wherein the ink pattern comprises a scenic, camouflaged or colored appearance.

9. The article of claim 4 wherein the thermoplastic elastomer is selected from the group consisting of styrenuic block copolymers, polyolefin blends, elastomeric alloys, thermoplastic polyurethanes, thermoplastic copolymers and thermoplastic polyamides.

\* \* \* \* \*